United States Patent [19]

Yoshihara et al.

[11] Patent Number: 5,161,559
[45] Date of Patent: Nov. 10, 1992

[54] CLEANING DEVICE FOR CONTACT LENSES

[75] Inventors: Mikio Yoshihara, Kariya; Masasi Kai, Toyota; Tomio Oguma, Anjo; Yasuhiro Aso, Kariya, all of Japan

[73] Assignee: Aisin Seiki Kabushiki Kaisha, Kariya, Japan

[21] Appl. No.: 677,339

[22] Filed: Mar. 29, 1991

[30] Foreign Application Priority Data

Mar. 31, 1990 [JP] Japan ................. 2-34533[U]
Mar. 31, 1990 [JP] Japan ................. 2-87134

[51] Int. Cl.⁵ ........................................ B08B 3/10
[52] U.S. Cl. ........................... 134/105; 134/184; 134/186; 134/901
[58] Field of Search ............ 134/155, 186, 188, 190, 134/901, 184, 187, 138, 105

[56] References Cited

U.S. PATENT DOCUMENTS

| | | | |
|---|---|---|---|
| 2,151,354 | 3/1939 | Osuch | 134/190 |
| 2,250,314 | 7/1941 | Rocke | 134/190 |
| 3,041,212 | 6/1962 | Booth | 134/138 X |
| 3,113,579 | 12/1963 | Willis | 134/901 X |
| 4,127,137 | 11/1978 | Butcher | 134/187 X |
| 4,721,124 | 1/1988 | Tuerkheimer et al. | 134/901 |
| 4,784,167 | 11/1988 | Thomas et al. | 134/184 X |
| 4,986,290 | 1/1991 | Oguma et al. | 134/901 X |

*Primary Examiner*—Frankie L. Stinson
*Attorney, Agent, or Firm*—Oblon, Spivak, McClelland, Maier & Neustadt

[57] ABSTRACT

A cleaning device for contact lens which includes a housing having a cleaning chamber which is provided with a container chamber, a container disposed in the container chamber and forming a lens receiving chamber which receives contact lenses therein and a stirring device for generating a rising liquid flow which rises toward to the container chamber and is disposed at a lower side of the container. The container has plural passage holes which communicate between an inside of the lens receiving chamber and outside of the lens receiving chamber. At least one of the passage holes opens diagonally and downwardly as regard to the lens receiving chamber so as to introduce the rising liquid flow into the lens receiving chamber. Since the rising liquid flow flows diagonally from below into the lens receiving chambers via the passage holes, the contact lenses are gently floated in the lens receiving chamber so as to separate from the wall surface of the lens receiving chamber. Accordingly, it is possible to effectively clean the contact lenses without damaging the contact lenses.

7 Claims, 8 Drawing Sheets

CLEANING DEVICE FOR CONTACT LENSES

BACKGROUND OF THE INVENTION

1. Field of the Invention

The present invention relates to a cleaning device for contact lenses.

2. Description of the Related Art

In order to clean a contact lens, in general, the contact lens taken off of a naked eye is held by the palm of a hand or the tip of finger, and is cleaned by dropping a cleaning liquid on its surface, followed by rubbing the contact lens with the tip of the finger. Dirt (particularly fat contained in tears) stained on the surface of a contact lens is thereby removed. After removal from the tip of the finger, the contact lens is rinsed with a rinsing liquid such as distilled water or the like. Thereafter, it is sterilized by boiling it in a preserving liquid such as a physiological saline solution or the like. After sterilizing, the contact lens is preserved in a preserving solution such as a physiological saline solution until the next morning.

Recently, as a cleaning device for contact lens, there have been developed an ultrasonic wave cleaner which cleans the contact lens with ultrasonic waves, and a cleaner which operates by a method of rubbing the surface of the contact lens in an elastic tray while manually holding the elastic tray.

However, there has been a problem that the cleaning of the contact lens could not be carried out efficiently by finger rubbing as aforementioned because, for example, dirt from the finger stains the surface of the contact lens. In the ultrasonic cleaner and the cleaner using the elastic tray system, even though they have the advantage that the contact lens need not be rubbed by a finger during cleaning, they cannot efficiently clean the contact lens. Particularly in case of a soft contact lens, the dirt on the surface of the contact lens cannot be entirely removed even if ultrasonic cleaning is carried out because it is formed of a soft material.

Furthermore, in a cleaner of the above ultrasonic system and a cleaner of the above elastic tray system, they are merely intended for cleaning the lens. For that reason, in case either rinsing or heat sterilizing of the contact lens must be performed after cleaning it, the lens has to be moved to another place or another device while holding the contact lens with the fingers, and dirt from the fingers may then stain or damage the contact lens. As a result, known techniques are still insufficient to efficiently execute the cleaning of the contact lens.

Therefore, the development of a cleaning device for contact lens which automatically performs a cleaning process, a rinsing process and a boiling process such as described above and which overcomes the above drawbacks is required.

SUMMARY OF THE INVENTION

It is, therefore, an object of the present invention to provide an improved cleaning device for contact lenses which can effectively clean the contact lenses without damaging the contact lenses.

It is another object of the present invention to improve the ease of maintenance.

In order to achieve these objects, there is provided a cleaning device for contact lenses which includes a housing having a cleaning chamber which is provided with a container chamber, a container disposed in the container chamber and forming a lens receiving chamber which receives contact lenses therein, and a stirring means for generating a rising liquid flow which rises toward to the container chamber and is disposed at a lower side of the container. The container has plural passage holes which communicate between an inside of the lens receiving chamber and an outside of the lens receiving chamber. At least one of the holes is diagonally and downwardly open with respect to the lens receiving chamber so as to introduce the rising liquid flow into the lens receiving chamber.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENTS

A cleaning device for contact lenses constituted in accordance with an embodiment of the present invention will be described with reference to the drawings.

Referring to FIG. 1–FIG. 5, there is schematically illustrated a cleaning device for contact lenses which includes a housing 1 having a cleaning chamber 5 which is provided with a container chamber 5a, a container 80 disposed in the container chamber 5a and forming a lens receiving chamber 83 which receives contact lens W therein, and a stirring means 15 for generating a rising liquid flow which rises toward to the container chamber 5a and is disposed at a lower side of the container 80.

Hereinafter, a detailed explanation will be added for all structural elements.

Figure 1:
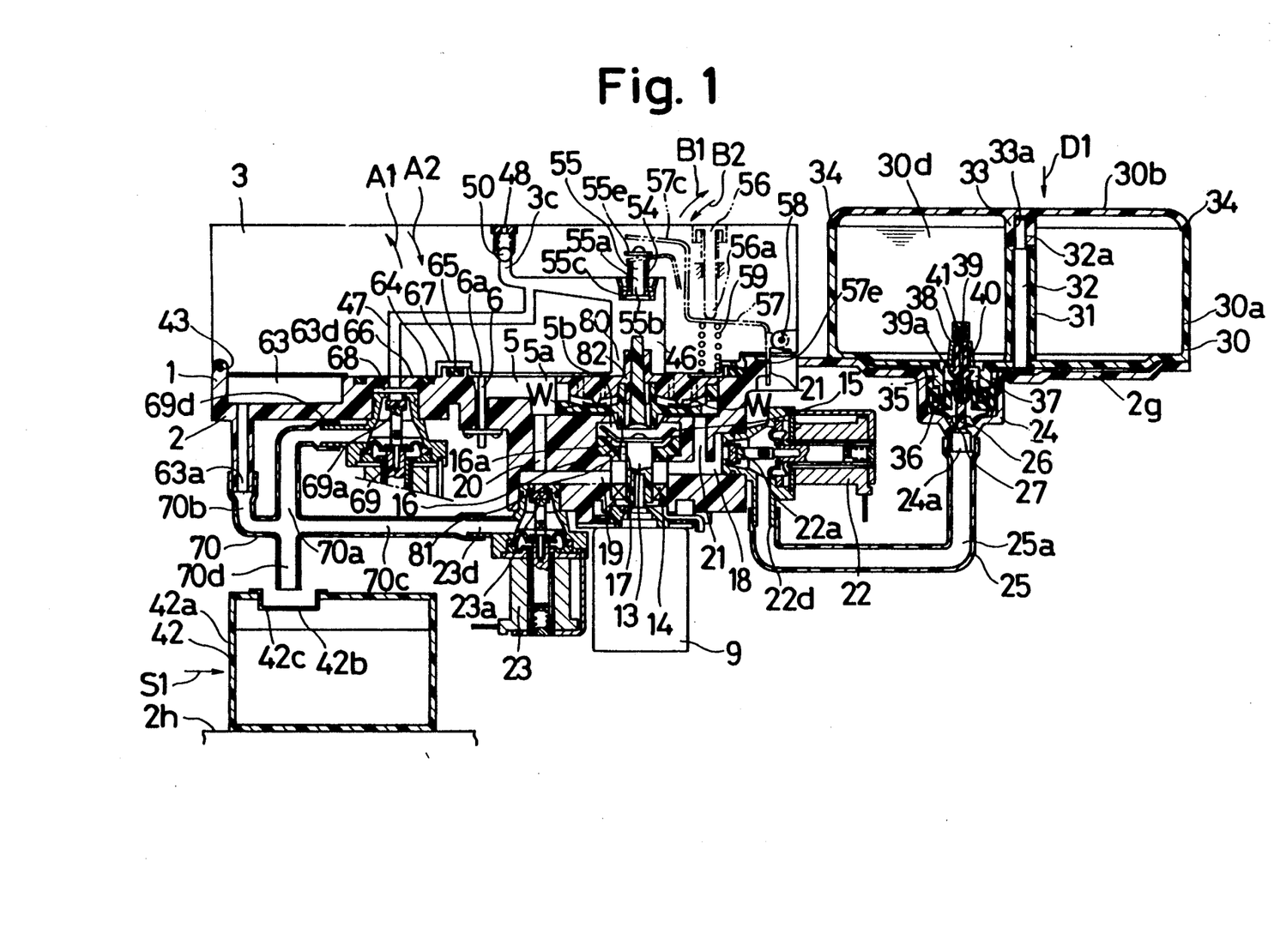
FIG. 1 is a schematic illustration view of an embodiment of a cleaning device for contact lens in accordance with the present invention.
Figure 2:
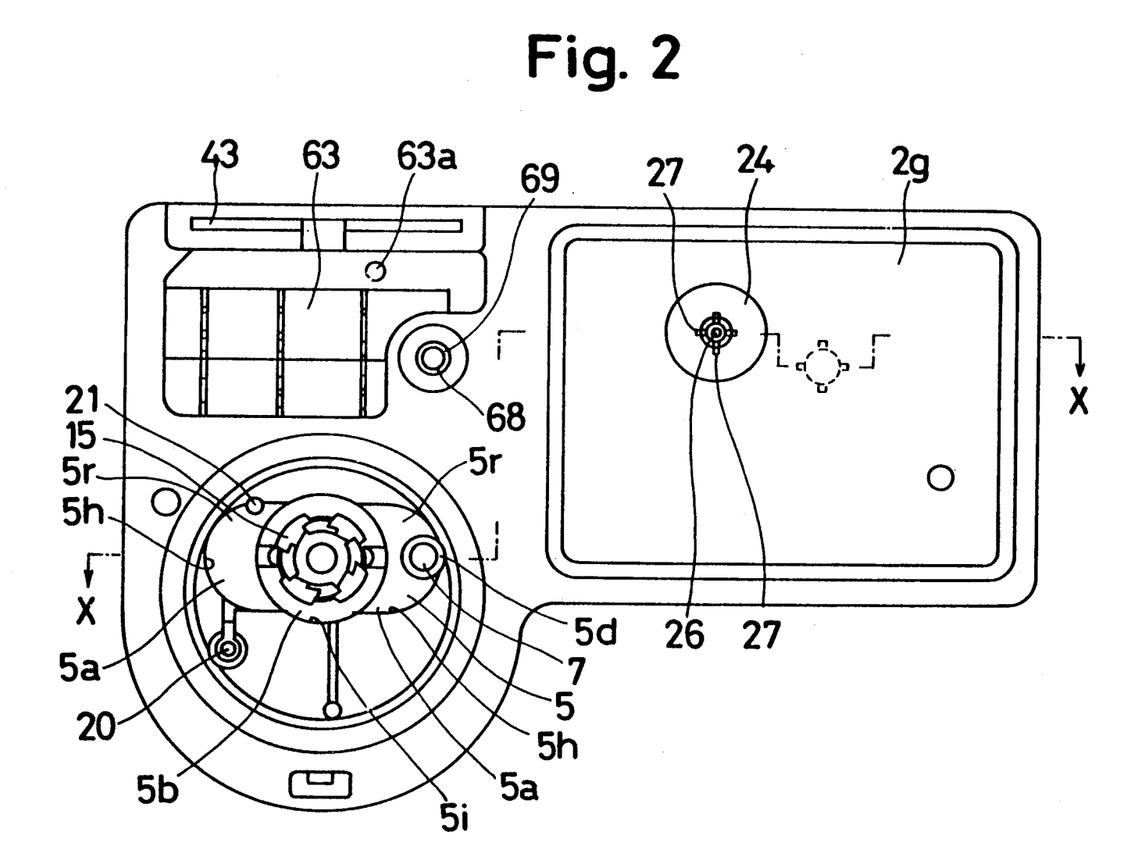
FIG. 2 is a plan view showing a state of removing a rotary cover member, a feeding tank and a impeller.
Figure 3:
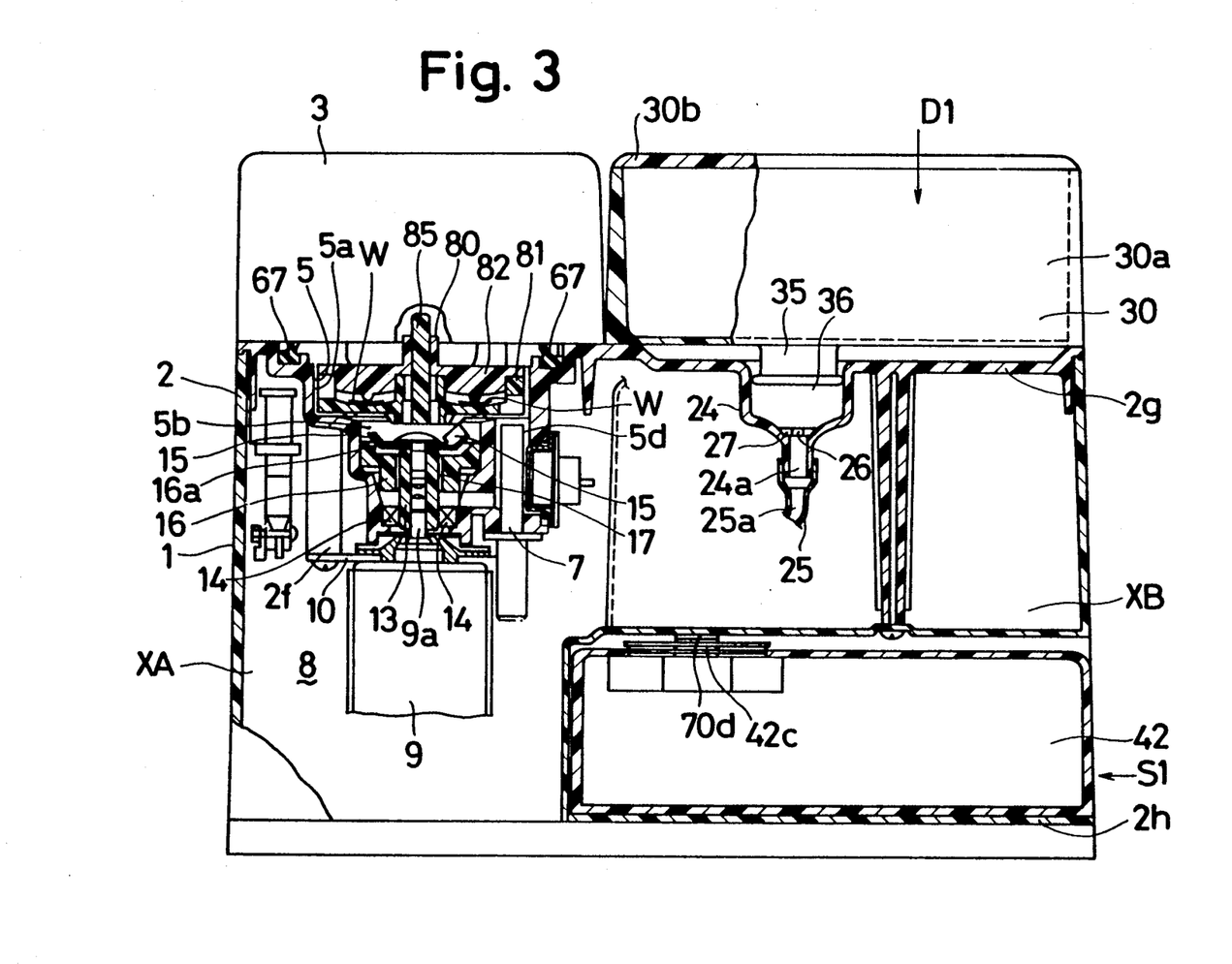
FIG. 3 is a cross sectional view taken along line X—X in FIG. 2.
Figure 4:
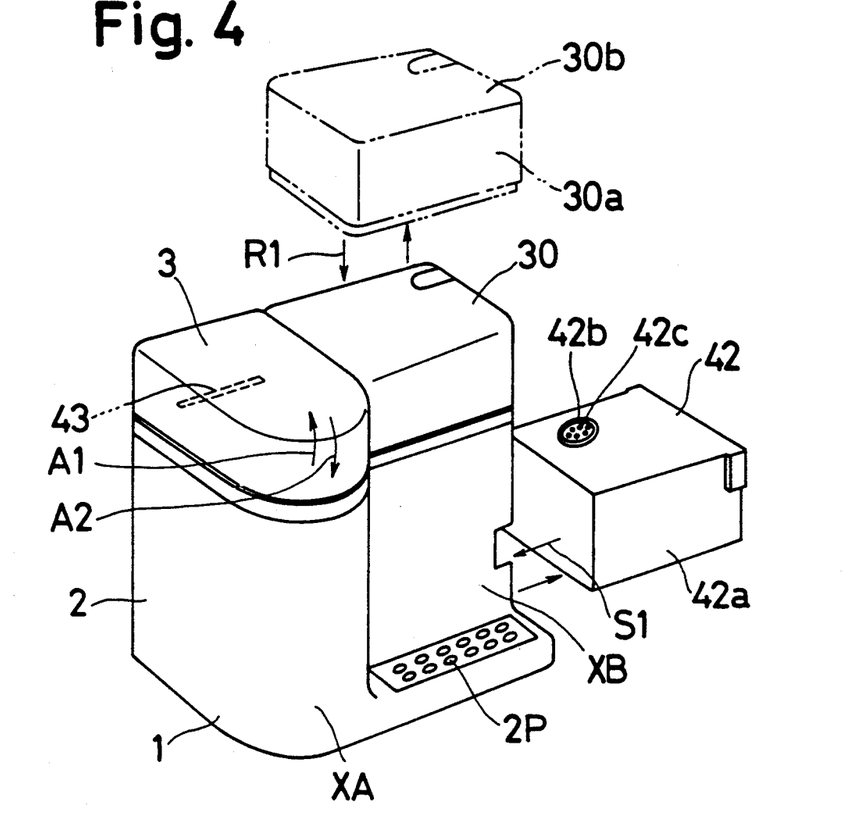
FIG. 4 is a schematic perspective view of an embodiment of a cleaning device for contact lenses in accordance with the present invention.
Figure 5:
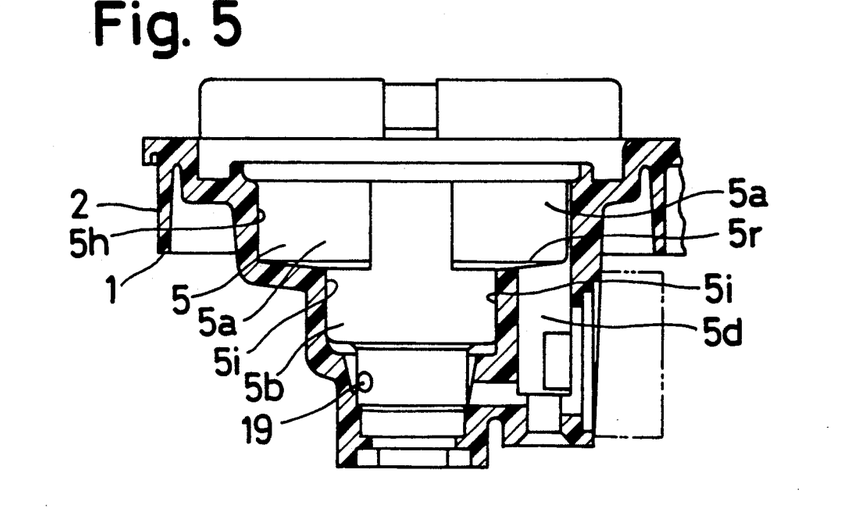
FIG. 5 is a cross sectional view of a cleaning chamber showing a state in which the impeller is removed, taken along line X—X in FIG. 2.
Figure 6:
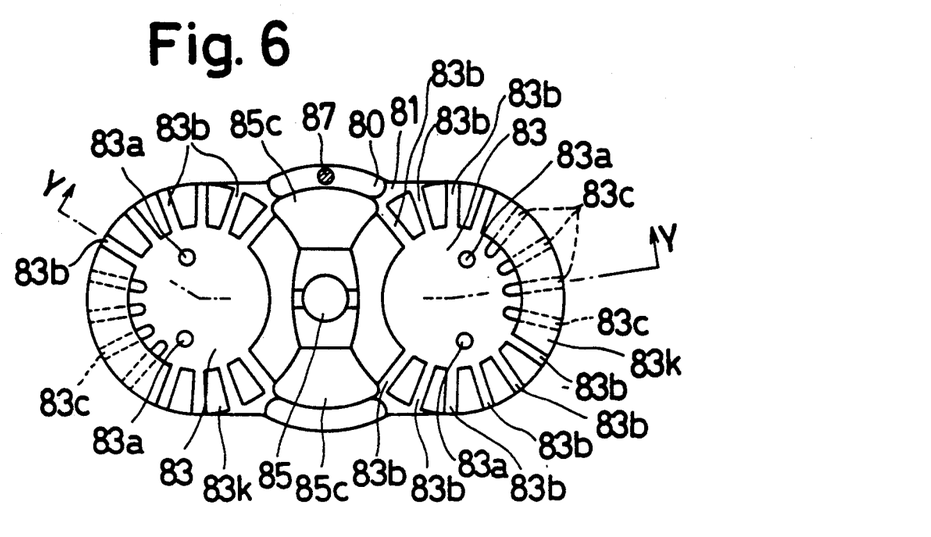
FIG. 6 is a plan view of a container body of a container in an embodiment of a cleaning device for contact lenses in accordance with the present invention.

The housing 1 will be explained first. As shown in FIG. 1, the housing 1 includes a body 2 and a rotary cover member 3. As shown in FIG. 3 and FIG. 4, a cleaning space XA and a tank disposing space XB are defined in the body 2. In the cleaning space XA is formed the cleaning chamber 5 which is open at an upper portion thereof. The cleaning chamber 5 includes the container chamber 5a which is positioned in an upper portion thereof and a stirring chamber 5b which is positioned in lower portion thereof. As shown in FIG. 2, a cross section of the container chamber 5a has an oblong shape and the container chamber 5a is defined by an inner wall 5h. A cross section of the stirring chamber 5b has a circular shape and the stirring chamber 5b is defined by an inner wall 5i. In the cleaning chamber 5 is disposed a liquid level sensor 6 as shown in FIG. 1. A height of a detecting surface which is formed on an upper end surface of the liquid level sensor 6 is set to a standard liquid level. A fluorine resin membrane is coated on an outer circumferential surface of the liquid level sensor 6 in order to electrically insulate the sensor 6 from liquid in the cleaning chamber.

Figure 9:
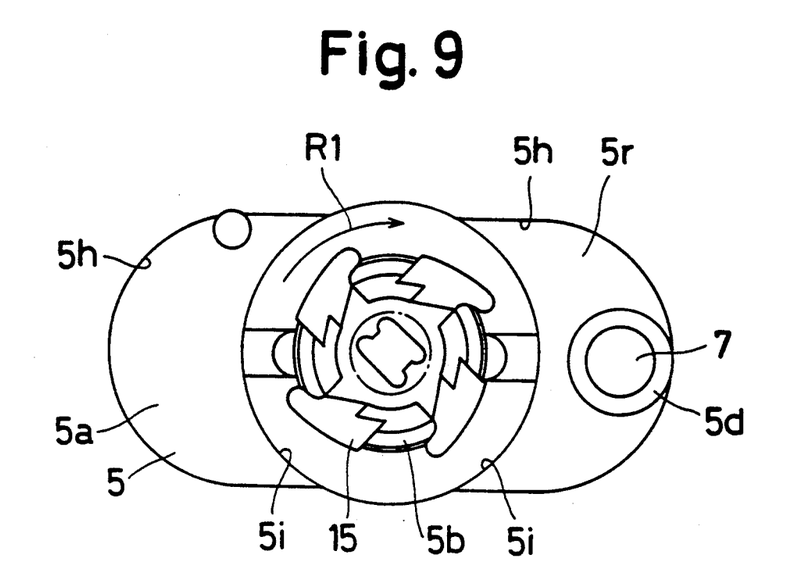
FIG. 9 is a plan view of a cleaning chamber.

As shown in FIG. 3, a heating means 7 is disposed in a heat chamber 5d of the cleaning chamber 5. Thereby, when the heating means 7 is activated, the liquid in the heat chamber 5d is heated. In the cleaning space XA, a motor chamber 8 is formed under the cleaninq chamber 5. In the motor chamber 8, a motor 9 is fixed to a boss portion 2f of the body 2 via an installing board 10. A rotational shaft 13 is pressed onto a motor shaft 9a of the motor 9 and is sealed by a sealing bearing 14. Thereby, it prevents flooding of the motor 9. A impeller 15 is connected with the rotational shaft 13 as the stirring means. The impeller 15 is received in the stirring chamber 5b. The rotational direction of the impeller 15 is shown by an arrow R1 in FIG. 9. A spacer 16 which has a conic tape surface 16a is disposed in the stirring chamber 5b in order to make the stirred liquid flow rise toward the container chamber 5a of the cleaning chamber 5. A passage 17 is formed between the spacer 16 and the rotational shaft 13.

Furthermore, as shown in FIG. 1, a feeding hole 18, a discharging hole 19 and passages 20, 21 are formed in the body 2. The feeding hole 18 and the discharging hole 19 are communicated with the cleaning chamber 5. The passages 20, 21 are communicated between the container chamber 5a and the stirring chamber 5b in order to circulate the liquid in the cleaning chamber 5. At the feeding hole 18, a feeding valve 22 which functions as a valve mechanism is disposed and a valve member 22a of the feeding valve 22 selectively opens a supply hole for the feeding hole 18. On the other hand, at the discharging hole 19, a discharging valve 23 functions as the valve mechanism and a valve member 23a of the discharging valve 23 selectively opens an exhaust hole of the discharging hole 19.

As shown in FIG. 1 and FIG. 3, a feeding tank installing portion 2g is formed in the upper portion of the tank disposing space XB of the body 2. The feeding tank installing portion 2g is positioned so as to be higher than the standard liquid level when the cleaning chamber is filled. In the feeding tank installing portion 2g is formed a concave liquid receiving portion 24 which is open at an upper portion thereof. A hole 24a of the liquid receiving portion 24 is communicated with a passage 22d of the feeding valve 22 via a pipe 25 having a passage 25a. A projection 26 is formed in the liquid receiving portion 24 via plural ribs 27.

Figure 11:
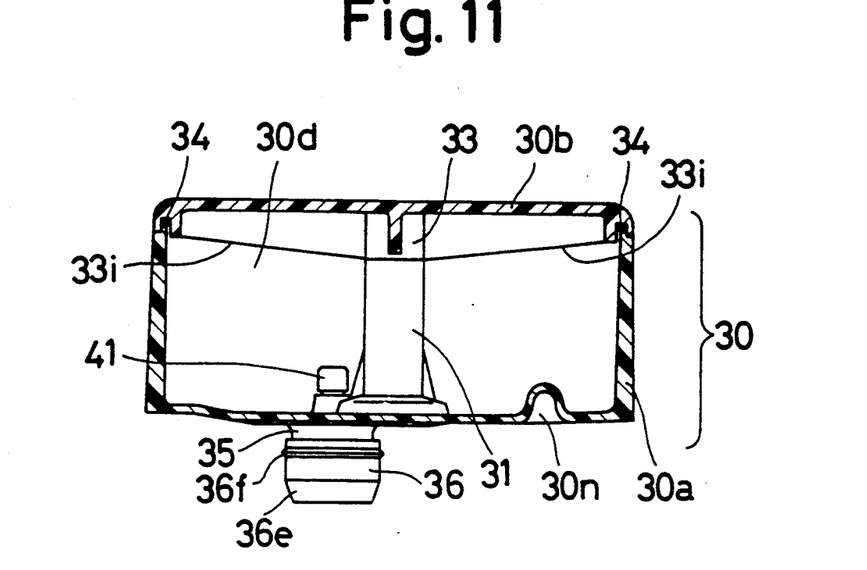
FIG. 11 is a cross sectional view of a feeding tank.
Figure 12:
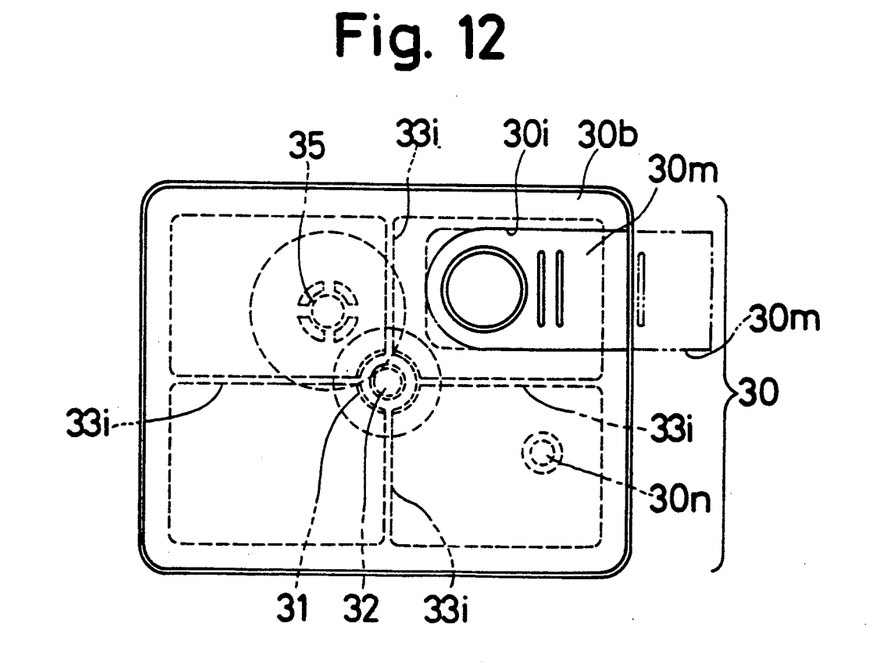
FIG. 12 is a plan view of the feeding tank.
Figure 13:
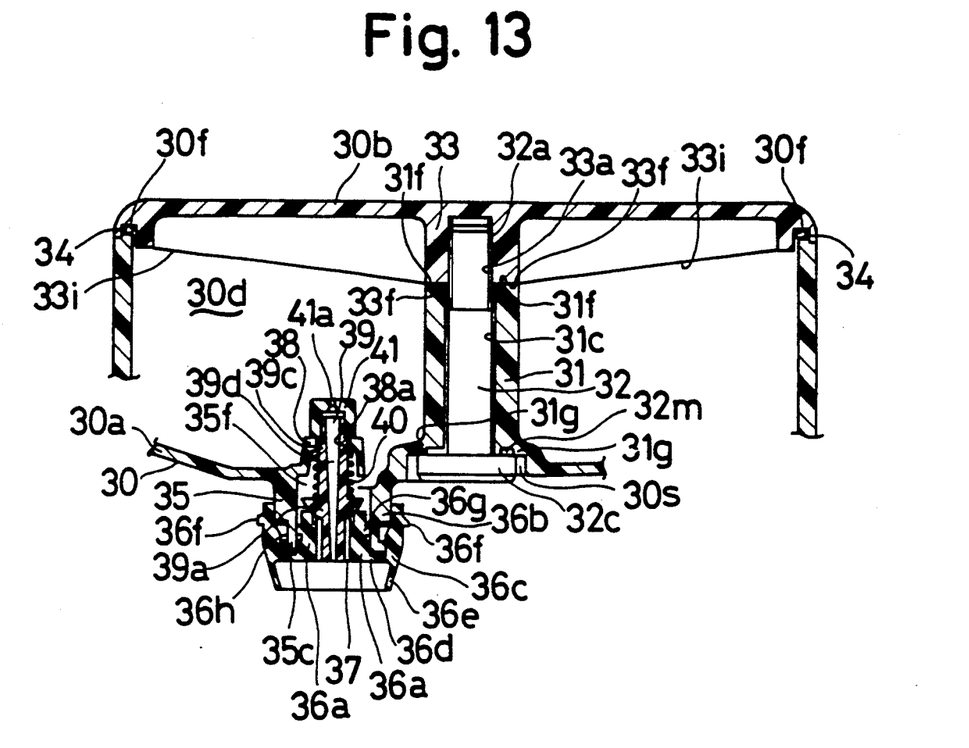
FIG. 13 is an enlarged cross sectional view showing a state of closing a valve of the feeding tank.

Furthermore, as shown in FIG. 3, in the feeding tank installing portion 2g, a feeding tank 30 may be detachably inserted by movement in the direction shown by arrow D1. The feeding tank 30 includes a feeding tank body 30a and a tank cover 30b which is reinforced by a rib 33i. As shown in FIG. 13, a male screw 32a of a bolt 32 which is inserted into a tubular portion 31 of the feeding tank body 30a via a sealing member 32m is fastened to a female screw 33a of a tubular portion 33 of the tank cover 30b. Thereby, an end portion 30f of the tank cover 30b is sealed by a sealing member 34 of the feeding tank body 30a. In this state, as shown in FIG. 1, a head portion 32c of the bolt 32 is engaged with an engaging portion 31g and is received in a concave portion 30s of the feeding tank. An upper end surface of the tubular portion 31 is contacted with a lower end portion of a projection 33 in order to prevent overtightening. In a tank chamber 30d of the feeding tank 30 is stored a physiological saline solution. The feeding tank 30 is shown in FIG. 11 and FIG. 12. The tank cover 30b of the feeding tank 30 includes a opening portion 30i for feeding and a sliding cover 30m which closes the opening portion 30i. A concave portion 30n is formed in the body 30a.

Figure 14:
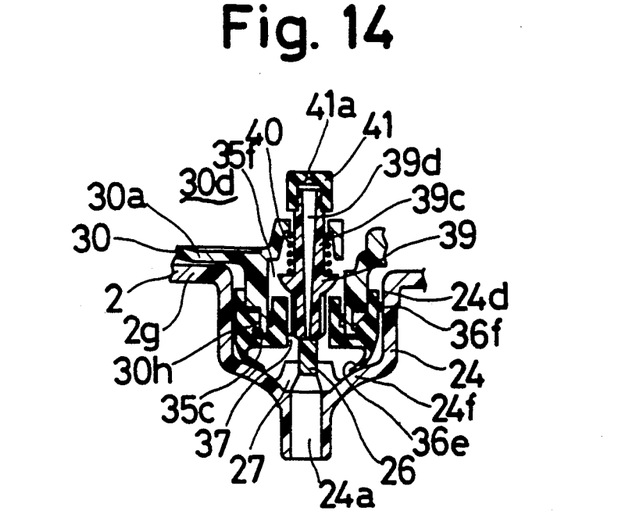
FIG. 14 is an enlarged cross sectional view showing a state of opening a the valve of the feeding tank.

As shown in FIG. 13 and FIG. 14, a feeding tube 35 is projected downward from the lower portion of the feeding tank 30. The feeding tube 35 is provided with a valve chamber 35f. A sealing member 36 made of silicon rubber is provided with an inner tube portion 36a, an outer tube portion 36c having a hole 36b, a bottom wall portion 36d connecting the inner tube portion 36a with the outer tube portion 36c and lip tube portion 36e. The lip tube portion 36e is conically formed so as to become smaller in the downward direction. In the outer tube portion 36c is formed a ring-shaped first sealing projecting portion 36f. In the inner tube portion 36a is formed a ring-shaped second sealing portion 36g. An engaging portion 36h of the sealing member 36 is engaged with an engaging portion 35c of the feeding tube 35. Thereby, the sealing member 36 is held on a lower end portion of the feeding tube 35. A feeding opening portion 3 is defined by an inner circumferential surface of the inner tube portion 36a of the sealing member 36.

A seat portion 38 extends toward an upper portion of the feeding tube and a valve 39 is inserted into a hole 38a of the seat portion 38. The valve 39 includes a shaft portion 39c having a passage 39d and a flange portion 39a which is formed at the center of the shaft portion 39c. A cylindrical shaped cap 41 which is made of rubber is fitted on an upper end portion of the valve 39. The cap 41 is provided with a small air-passage 41a. An opening area of the air-passage 41a is set so as not to permit the invasion of liquid but to permit air communication.

In a state before the feeding tank 30 is installed in the feeding tank installing portion 2g, as shown in FIG. 13, the flange portion 39a of the valve 39 is continuously urged downward by a spring 40 and is pressed onto the inner tube portion 36a. Thereby, the feeding opening portion 37 is closed and is sealed. On the other hand, in a state after the feeding tank 30 is installed in the feeding tank installing portion 2g, since the feeding tube 35 is inserted into the liquid receiving portion 24 as shown in FIG. 14, the valve 39 is upwardly pressed by the projection 26 against the spring 40. Accordingly, the feeding opening portion 37 is opened and the liquid in the tank chamber 30d of the feeding tank 30 is supplied to the liquid receiving portion 24. At this time, as shown in FIG. 14, the first sealing projecting portion 36f of the sealing member 36 is adhered closely to a wall surface 24d of the liquid receiving portion 24 and is sealed. Also, since the lip tube portion 36e is pressed to a cone-shaped bottom surface 24f of the liquid receiving portion 24 and is compressed, the lip tube portion 36e is adhered closely to the bottom surface 24f by elastic force and is sealed. Now, when the feeding tube 35 is inserted into the liquid receiving portion 24 for installing the feeding tank 30, since the liquid receiving portion 24 is sealed by the sealing member 36, the pressure in the liquid receiving portion 24 is increased and there is normally a danger of improper installing of the sealing member 36. In this embodiment, however, since it is possible to relieve the pressure via the hole 39d of the valve 39 and the air-passage 41a of the cap 41, it is possible to easily insert the sealing member 36 into the liquid receiving portion 24.

In the lower portion of the tank disposing space XB is formed a discharging tank installing portion 2h which is positioned under the feeding tank installing portion 2g. A discharging tank 42 is inserted in the discharging tank installing portion 2h in the direction shown by an arrow S1 in FIG. 3. As shown in FIG. 4, the discharging tank 42 includes a body 42a and a small cover 42c which is provided with a hole 42b and which closes the opening portion of the body 42a. The small cover 42c is positioned so as to be lower than the cleaning chamber 5.

As shown in FIG. 4, an operational panel 2p which selectively operates each operational mode is disposed in front of the housing 1. The pivoting cover member 3 is installed on the body 2 by a hinge shaft 43 so as to be able to pivot in the directions shown in arrows A1, A2 in FIG. 4. When the pivoting cover member 3 is pivoted, the upper portion of the cleaning chamber 5 opened or closed.

Furthermore, as shown in FIG. 1, an L-shaped chamber 46 is formed in the rotary cover member 3. Steam is stored and condensed in the chamber 46. The chamber 46 communicates between the cleaning chamber 5 and a pressure relief hole 48 of the cove member 3. A hole 3c is continuously closed by a pressure regulating check valve 50 which is urged by a spring 49 and the communication between the pressure relief hole 48 and the chamber 46 is thus interrupted. Furthermore, a passage 54 is formed in the cover member 3. The passage 54 communicates the cleaning chamber 5 with the atmosphere. A check valve 55 is disposed in the cover member 3 so as to prevent negative pressure in the chamber 46. The check valve 55 includes a shaft portion 55a, a flange portion 55b which is formed on a lower end portion of the shaft portion 55a and a ring-shaped sealing member 55c which is fitted on the flange portion 55b. A plate 55e of the shaft portion 55a is urged by a spring and a communication passage 54 is sealed by the sealing member 55c. A hole is formed in upper surface portion of the cover member 3 and push-type button 56 is held in the hole. The button 56 is provided with an operational shaft portion 56a. Furthermore, as shown in FIG. 1, a locking plate 57 which locks the cover member 3 is pivoted on a shaft 58 so as to be able to rotate in the directions of arrows B1, B2. The locking plate 57 is continuously urged by a spring 59 toward the direction of an arrow B1. Accordingly, an operational portion 57c of the locking plate 57 is normally separated from an upper end portion of the shaft portion 55a of the check valve 55.

Furthermore, in the body 2 are formed a storing chamber 63 and sealing grooves 64, 65. Sealing members 66, 67 are fitted in the sealing grooves 64, 65, respectively. Furthermore, a hole 68 which is communicated with the passage 47 of the cover member 3 is formed in the body 2. An air-opening valve 69 is disposed in the hole 68. A valve member 69a of the air-opening valve 69 opens and closes the hole 68. As shown in FIG. 1, furthermore, a conduit 70 having passages 70a–70d is disposed in the body 2. The passage 70a of the conduit 70 is connected with a passage 69d of the air-opening valve 69 and the passage 70b is connected with a drain hole 63a of the storing chamber 63. Further, the passage 70c is connected with a passage 23d of the discharging valve 23 and the passage 70d is opposite to the small cover 42c of the discharging tank 42.

Figures 7, 8:
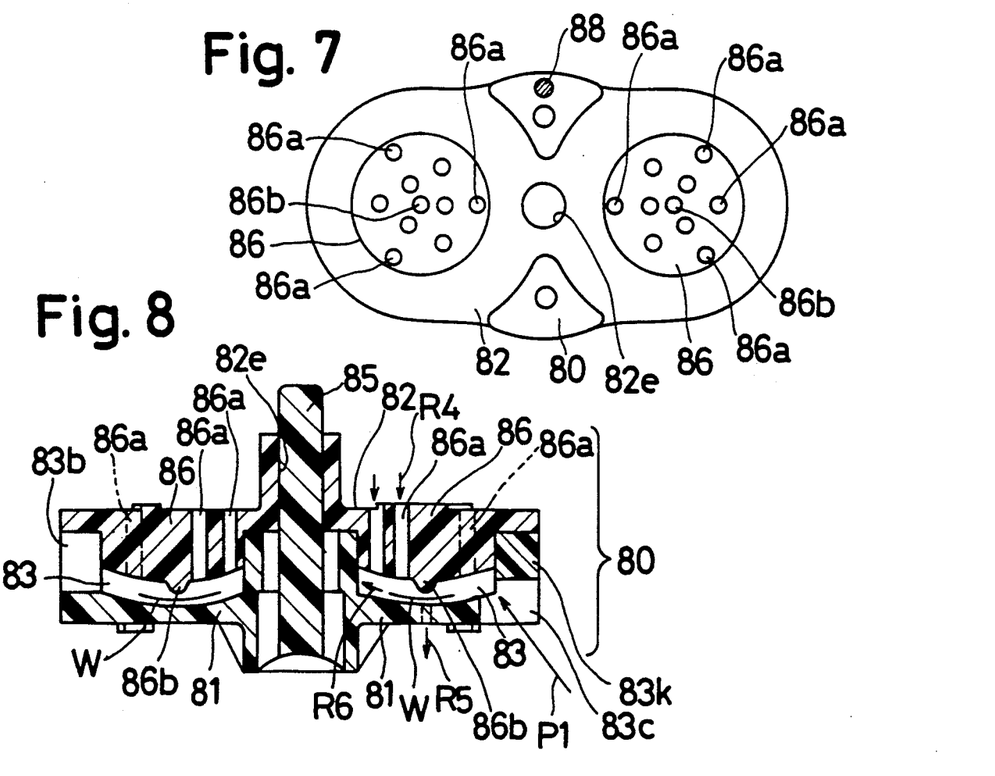
FIG. 7 is a plan view of a cover member of the container in an embodiment of a cleaning device for contact lenses in accordance with the present invention.
FIG. 8 is a cross sectional view of the container taken along line Y—Y in FIG. 6.
Figure 10:
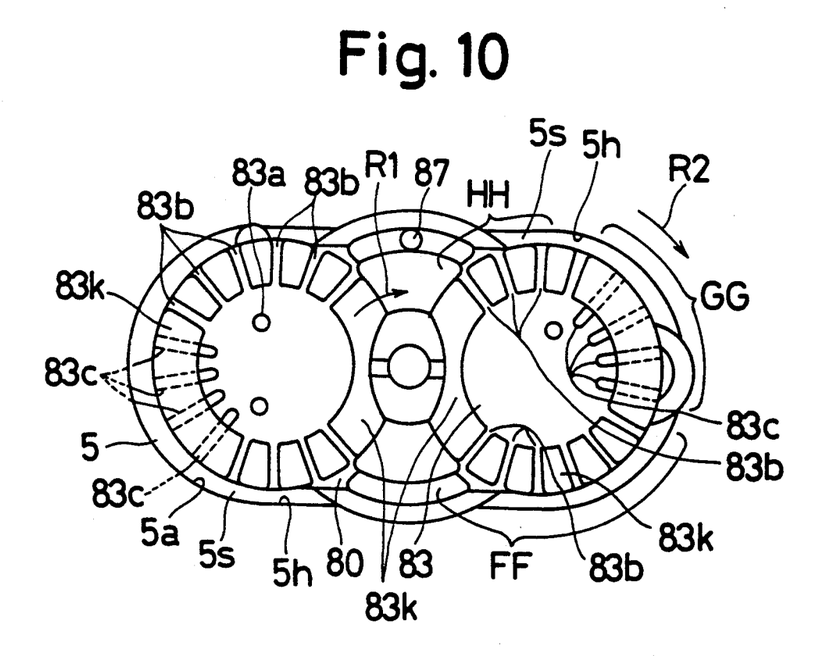
FIG. 10 is a cross sectional view showing a state of holding the container body of the container in the cleaning chamber.

Referring to FIG. 6–FIG. 10, the container 80 is made of resin and receives the contact lenses W within. The container 80 is constituted by a container body 81 and a cover 82. In the container body 81, two lens receiving chambers 83 are formed therein. Plural passage holes 83a are formed in a bottom wall of the lens receiving chamber 83 and vertically penetrate the bottom wall. As shown in FIG. 10, a ring-shaped side wall portion 83k which has a large thickness is divided into a domain HH, a domain GG and a domain FF. In the domains HH, FF, plural slit-shaped passage holes 83b are radially formed, respectively. In the domain GG, plural passage holes 83c are radially formed therein. As shown in FIG. 8, the passage holes 83b horizontally extend through the side wall portion 83k and the passage holes 83c diagonally and downwardly extend through the side wall portion 83k.

In a center portion of the container body 81 is formed a long bar-shaped projecting portion 85 which extends upwardly in order to permit gripping by fingers. In the container body 81, a relief hole 85c is formed near the projecting portion 85. The relief hole 85c relieves the liquid to the side of the impeller 15.

On the other hand, the cover 82 is fitted in upper opening portions of the lens receiving chambers 83 of the container body 81 and closes the lens receiving chambers 83. As shown in FIG. 7, a holding hole 82e which holds the projecting portion 85 therein is formed in the cover 82. Furthermore, two projecting engaging portions 86 each have a large thickness and are formed in the cover 82, and each engaging portion 86 is fitted in a lens receiving chamber 83, respectively. In the engaging portion 86, plural small circular passage holes 86a are formed and extend vertically. A regulating projecting portion 86b is formed on a center portion of bottom surface of each engaging portion 86. As shown in FIG. 10, in a state in which the container 8 is received in the container chamber 5a of the cleaning chamber 5, a clearance 5s is formed between an inner wall surface 5h and the container 80 in order to permit liquid flow.

Now, a projecting portion 87 is formed on the container body 81 and a projecting portion 88 is formed on the cover 82. Thereby, when the cover 82 is reversely fitted in the container body 81 by mistake (when the container body 81 is reversely fitted on the cover 82 by mistake), since both projecting portions 87, 88 are contacted within each other, the error is easily noted and the cover 82 is not fitted in the container body 81 by mistake.

The above-described embodiment of the cleaning device for contact lenses operates as follows. First of all, the pivoting cover member 3 is pivoted and the cleaning chamber 5 is opened. Next, a few drops of concentrated cleaning liquid are dropped into the cleaning chamber 5 and the contact lenses W are received in the lens receiving chambers 83 of the container 80. Next, the container 80 is set on a step portion 5r and so is received in the container chamber 5a, and then the pivoting cover member 3 is closed. At this time, as shown in FIG. 1, an engaging hole 57e of the locking plate 57 is engaged with an engaging projecting portion 2i of the body 2 and the cover member 3 is locked. Furthermore, the feeding tank 30 which stores the liquid is inserted in the direction shown by arrow D1 in FIG. 1 and so is installed on the feeding tank installing portion 29. Thereby, as shown in FIG. 1, the valve member 39 of the feeding tank 30 contacts with the projecting portion 26 and is pushed up by the projecting portion 26 so as to open the feeding opening portion 37.

In the above state, when a starting switch (not shown) is operated, the feeding valve 22 is opened for a certain time by a timer. Thereby, the liquid in the tank chamber 30d of the feeding tank 30 is supplied to the cleaning chamber 5 via the passage 25a by gravity. Accordingly, the cleaning chamber 5 is filled up to a standard liquid level. Thereby, the concentrated cleaning liquid is diluted.

Now, in the feeding operation, since the air-opening valve 69 is opened and the hole 68 is opened, the cleaning chamber 5 is communicated with atmosphere via the chamber 46, the passage 47 and the passage 70a and it is possible to smoothly feed the liquid. When the feeding operation is ended, the motor 9 is rotated for a certain time and the impeller 15 is rotated with a high speed of 8,000 rpm. As a result, the liquid in the stirring chamber 5b of the cleaning chamber 5 generates a rising-stirring liquid flow which rises toward the container chamber 5a while revolving. The rising-stirring liquid flow flows into the len receiving chambers 83 via the passage holes 83a, 83c and the contact lenses W in the lens receiving chambers 83 are cleaned.

At this time, as shown in FIG. 10, since the impeller 15 is rotated clockwise toward the direction shown by an arrow R1, the rising-stirring liquid flow in the stirring chamber 5b is also rotated clockwise. Accordingly, the rising-stirring liquid flow from the stirring chamber 5b into the container chamber 5a flows in the clearance 5s along the inner wall surface 5h of the container chamber 5a and in the direction shown by an arrow R2. The rising-stirring liquid flow which flowed in the clearance 5s in the direction shown by the arrow R2 thus flows into an inner portion of the lens receiving chamber 83 via the passage holes 83b, 83c. At this time, the rising-stirring liquid flow turns upward in the domain GG as shown in FIG. 10 and the rising-stirring liquid flow turns downward in the domain FF, because the domain GG is positioned near the impeller 15 which is stirring source and the domain FF is positioned further from the impeller 15 which is stirring source.

In this embodiment, since the passage holes 83c of the container 80 are diagonally and downwardly penetrated into the domain GG, the rising-stirring liquid flow flows diagonal from below into the lens receiving chambers 83 in the direction shown by an arrow P1 in FIG. 8 via the passage holes 83c. Therefore, the contact lenses W are gently floated in the lens receiving chamber 83 so as to separate from the wall surface of the lens receiving chamber 83 and are effectively cleaned.

Now, in the cleaning operation, the direction of the rising-stirring liquid flow in the lens receiving chamber 83 is believed to be directions shown by arrows R4, R5 and R6 in FIG. 8. In the cleaning operation, since minute bubbles of air are mixed in the rising-stirring liquid flow, dirt on the contact lenses W is effectively eliminated. At this time, the feeding valve 22, the discharging valve 23 and the air-opening valve 69 are closed and the cleaning chamber 5 is held under a sealed condition.

When the cleaning operation is ended and the motor 9 is stopped, the discharging valve 23 is opened. As a result, the liquid in the cleaning chamber 5 which cleaned the contact lens W is discharged to the discharging tank 42 via the passage 17, discharging hole 19 and the passage 70c.

Next, the feeding valve 22 is opened for a certain time and the liquid in the feeding tank 30 is supplied to the cleaning chamber 5 by gravity. In this state, the motor 9 is rotated for a certain time such that the impeller 15 is rotated clockwise in the direction shown by an arrow R1, as in the above cleaning operation. As a result, a rising-stirring liquid flow which rises toward the container chamber 5a while revolving is generated in the cleaning chamber 5 and the contact lenses W are rinsed by this rising-stirring liquid flow. At this time, since the passage holes 83c of the container 80 are diagonally and downwardly formed, the rising-stirring liquid again flow flows diagonally from below into the lens receiving chambers 83 via the passage holes 83c. Therefore, the contact lenses W are again gently floated in the lens receiving chamber 83 so as to separate from the wall surface of the lens receiving chamber 83 and are effectively rinsed.

When the rinsing operation is ended, the discharging valve 23 is opened and the liquid in the cleaning chamber 5 is discharged to the discharging tank 42. An the rinsing operation, the feeding valve 22, the discharging valve 23 and the air-opening valve 69 are also closed and the cleaning chamber 5 is held under a sealed condition.

Next, the feeding valve 22 is again opened for a certain time. Thereby, the liquid in feeding tank 30 is supplied to the cleaning chamber 5 by gravity. In this state, the heating means 7 is operated for a certain time by a timer. As a result, the liquid in the cleaning chamber 5 is heated and the contact lenses W are sterilized by boiling. When the contact lens W are to be used, the cover member 3 is pivoted and the container 80 is taken out from the cleaning chamber 5. Furthermore, the cover 82 is taken off from the container 81 and then the contact lens W is taken out. In the boiling operation, the feeding valve 22, the discharging valve 23 and the air-opening valve 69 are again closed and the cleaning chamber 5 is held under a sealed condition in order to prevent the invasion of dust or bacteria. When the pressure in the cleaning chamber 5 abnormally increased in the boiling operation, the pressure regulating check valve 50 is opened and the hole 3c is thereby opened. The abnormally high pressure is thus relieved via the relief hole 48 and an abnormal increase the pressure in the cleaning chamber 5 is avoided.

Since the cleaning chamber 5 is held in a sealed condition during boiling, the pressure in the cleaning chamber 5 becomes negative as the cleaning chamber 5 cools and a pressure difference is generated between the cleaning chamber 5 and the atmosphere. As a result, the opening operation of the cover member 3 may be made difficult by the pressure difference. In this embodiment, this problem is avoided as follows. When the button 56 of the rotary cover member 3 is pushed, the locking plate 57 is pushed by the operational shaft portion 56a. Thereby, both the locking plate 57 is rotated and the check valve 55 is pushed by the operational portion 57c of the locking plate 57. As a result, the flange portion 55b and the sealing member 55c are lowered and the passage 54 is opened. Thereby, the cleaning chamber 5 is communicated with atmosphere and the negative pressure in the cleaning chamber 5 is relieved.

As mentioned above, according to this embodiment, since the contact lenses W are cleaned and rinsed by the high speed liquid flow, as compared with the prior ultrasonic system and elastic tray system, it is possible to effectively clean the contact lenses W.

In this embodiment, in particular, since the passage holes 83c of the container 80 extend diagonally and downwardly, the rising-stirring liquid flow again flows diagonally from below into the lens receiving chambers 83 via the passage holes 83c. Therefore, the contact lenses W are gently floated in the lens receiving chamber 83 so as to separate from the wall surface of the lens receiving chamber 83. Accordingly, the contact lenses W are effectively cleaned and are effectively rinsed. Furthermore, it is possible to avoid damage to the contact lenses W by contact with wall surface of the lens receiving chamber 83 in the cleaning operation or the rinsing operation. Therefore, even though the hard contact lenses which are apt to be damaged are cleaned, it is possible to avoid damage to the contact lenses.

Furthermore, in this embodiment, since the feeding tank 30 is used both for cleaning and rinsing, it is possible to reduce the number of the tanks. Therefore, it is possible to reduce the number of the passages which communicate between the cleaning chamber 5 and the feeding tank 30. Furthermore, it is possible to reduce the number of valves which feeds the liquid from the feeding tank 30 to the cleaning chamber 5. Accordingly, it is possible to miniaturize the device and reduce the manufacturing cost. Furthermore, when a user must change the type of cleaning liquid used, this can easily be done.

In this embodiment, furthermore, it is possible to feed the liquid in the feeding tank 30 which is used in common for cleaning, rinsing and boiling to the cleaning chamber 5 by gravity and it is possible to discharge the liquid in the cleaning chamber 5 to the discharging tank 42 by gravity after cleaning or rinsing.

Furthermore, in this embodiment, since the feeding tank 30 and the discharging tank 42 are detachably disposed, respectively, it is possible to carry an extra feeding tank 30 in order to supplement the liquid when the feeding tank 30 is empty. Further, it is possible to carry an extra discharging tank 42. Furthermore, since the discharging tank 42 is disposed right under the feeding tank 30, the amount of the liquid in the discharging tank 42 is increased as the amount of the liquid in the feeding tank 30 is decreased. Therefore, it possible to maintain a weight balance between the cleaning space XA and the tank disposing space XB.

Furthermore, in this embodiment, the feeding tank 30 is installed on the feeding tank installing portion 2g which is formed on the upper surface portion of the body 2 by downward movement and is removed from the feeding tank installing portion 2g by upward movement. Therefore, it is possible to easily install or remove the feeding tank 30 and it is possible to improve the ease of maintenance of the device. Furthermore, in this embodiment, the body 2 is provided with the operational panel 2p at the right side thereof. The pivoting cover member 3 is positioned in left side of the body 2. Therefore, it is possible to operate the operational panel 2p by the right hand of the user while operating the cover member 3 by the left hand and so it is possible to improve the operational performance.

As mentioned above, according to the present invention, since the passage holes of the container extend diagonally and downwardly, the rising-stirring liquid flow flows diagonally from below into the lens receiving chambers via the passage holes. Therefore, the contact lenses are gently floated in the lens receiving chamber so as to separate from the wall surface of the lens receiving chamber. Accordingly, it is possible to effectively clean the contact lenses without damaging the contact lenses.

The principles, preferred embodiment and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in appended claims.

What is claimed as new and desired to be secured by Letters Patent of the United States is:

1. A cleaning device for contact lenses, comprising:
   a housing defining a cleaning chamber including a container chamber;
   a container disposable in the container chamber and forming a lens receiving chamber which receives contact lenses therein; and
   stirring means in the cleaning chamber and below the container chamber for generating a rising liquid flow in the cleaning chamber, which flow rises to the container chamber when the stirring means is operated,
   wherein the container has plural passage holes which communicate between the lens receiving chamber and an outside of the container, and wherein at least one of said passage holes extends diagonally and downwardly from the lens receiving chamber at a position corresponding to the rising liquid flow when the container is disposed in the container chamber, so that the rising liquid flow can enter the lens receiving chamber.

2. A cleaning device for contact lenses as recited in claim 1, wherein said stirring means comprises means for generating a rising liquid flow of sufficient strength that wheein the contact lens is floated in the lens receiving chamber and separates from the wall surface of the lens receiving chamber by the rising liquid flow when the stirring means is operated.

3. A cleaning device for contact lenses as recited in claim 2, further comprising a feeding tank which is positioned so as to be higher than a full liquid level of the cleaning chamber, means for feeding the liquid from the feeding tank to the cleaning chamber by gravity, a discharging tank positioned lower than a lowermost liquid level in the cleaning chamber, and means for delivering discharged liquid from the cleaning chamber to the discharging tank by gravity.

4. A cleaning device for contact lens as recited in claim 3, further comprising a valve means for controlling communication between the cleaning chamber and the feeding tank and between the cleaning chamber and the discharging tank.

5. A cleaning device for contact lenses as recited in claim 4, further comprising a heating means for boiling the liquid in the cleaning chamber in order to sterilize contact lens therein, wherein the feeding means feeds a single liquid which is used in common for cleaning and rinsing.

6. A cleaning device for contact lens as recited in claim 4, wherein the housing includes a tank installing portion at an upper portion thereof and the feeding tank is detachably installed on the tank installing portion by downward movement and is removed from the tank installing portion by upward movement.

7. A cleaning device for contact lens as recited in claim 1, wherein the stirring means includes an impeller which generates the rising liquid flow and a motor which rotates the impeller with high rotational speed.

* * * * *